United States Patent
Chan et al.

(10) Patent No.: US 11,200,677 B2
(45) Date of Patent: Dec. 14, 2021

(54) METHOD, SYSTEM AND APPARATUS FOR SHELF EDGE DETECTION

(71) Applicant: ZEBRA TECHNOLOGIES CORPORATION, Lincolnshire, IL (US)

(72) Inventors: Tze Fung Christopher Chan, Toronto (CA); Feng Cao, Burlington (CA); Mehdi Mazaheri Tehrani, Brampton (CA); Mahyar Vajedi, Mississauga (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 12 days.

(21) Appl. No.: 16/429,920

(22) Filed: Jun. 3, 2019

(65) Prior Publication Data
US 2020/0380694 A1   Dec. 3, 2020

(51) Int. Cl.
*G06T 7/13* (2017.01)
*G06T 7/50* (2017.01)
(Continued)

(52) U.S. Cl.
CPC .................. *G06T 7/13* (2017.01); *G06T 7/11* (2017.01); *G06T 7/149* (2017.01); *G06T 7/187* (2017.01);
(Continued)

(58) Field of Classification Search
None
See application file for complete search history.

(56) References Cited

U.S. PATENT DOCUMENTS

| 5,209,712 A | 5/1993 | Ferri |
| 5,214,615 A | 5/1993 | Bauer |

(Continued)

FOREIGN PATENT DOCUMENTS

| CA | 2835830 | 11/2012 |
| CA | 3028156 | 1/2018 |

(Continued)

OTHER PUBLICATIONS

"Fair Billing with Automatic Dimensioning" pp. 1-4, undated, Copyright Mettler-Toledo International Inc.
(Continued)

*Primary Examiner* — Kevin Ky

(57) ABSTRACT

A method of detecting an edge of a support surface in an imaging controller includes: obtaining image data captured by an image sensor and a plurality of depth measurements captured by a depth sensor, the image data and the plurality of depth measurements corresponding to an area containing the support surface; detecting preliminary edges in the image data; applying a Hough transform to the preliminary edges to determine Hough lines representing candidate edges of the support surface; segmenting the plurality of depth measurements to assign classes to each pixel, each class defined by one of a plurality of seed pixels, wherein the plurality of seed pixels are identified from the depth measurements based on the Hough lines; and detecting the edge of the support surface by selecting a class of pixels and applying a line-fitting model to the selected class to obtain an estimated edge of the support surface.

18 Claims, 8 Drawing Sheets

(51) Int. Cl.
    *G06T 7/149*     (2017.01)
    *G06T 7/70*     (2017.01)
    *G06T 7/187*     (2017.01)
    *G06T 7/11*     (2017.01)

(52) U.S. Cl.
    CPC ............... *G06T 7/50* (2017.01); *G06T 7/70* (2017.01); *G06T 2207/10028* (2013.01); *G06T 2207/20061* (2013.01); *G06T 2207/20156* (2013.01)

(56) References Cited

U.S. PATENT DOCUMENTS

| | | |
|---|---|---|
| 5,408,322 A | 4/1995 | Hsu et al. |
| 5,414,268 A | 5/1995 | McGee |
| 5,534,762 A | 7/1996 | Kim |
| 5,566,280 A | 10/1996 | Fukui et al. |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,571,314 B2 | 10/2013 | Tao et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,072,929 B1 * | 7/2015 | Rush .................. G06F 19/3481 |
| 9,129,277 B2 | 9/2015 | Macintosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,589,353 B2 | 3/2017 | Mueller-Fischer et al. |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,953,420 B2 | 4/2018 | Wolski et al. |
| 9,980,009 B2 | 5/2018 | Jiang et al. |
| 9,994,339 B2 | 6/2018 | Colson et al. |
| 9,996,818 B1 | 6/2018 | Ren et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,373,116 B2 | 8/2019 | Medina et al. |
| 10,394,244 B2 | 8/2019 | Song et al. |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |

(56) References Cited

U.S. PATENT DOCUMENTS

| | | |
|---|---|---|
| 2004/0131278 A1 | 7/2004 | imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0017407 A1 | 1/2010 | Beniyama et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0235033 A1 | 9/2010 | Yamamoto et al. |
| 2010/0241289 A1 | 9/2010 | Sandberg |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0019393 A1 | 1/2012 | Wolinsky et al. |
| 2012/0022913 A1 | 1/2012 | VolKmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller et al. |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0235165 A1 | 9/2013 | Gharib et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0129027 A1 | 5/2014 | Schnittman |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0300637 A1 | 10/2014 | Fan et al. |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0032304 A1* | 1/2015 | Nakamura ............ G01S 19/52 701/21 |
| 2015/0039458 A1 | 2/2015 | Reid |
| 2015/0088618 A1 | 3/2015 | Basir et al. |
| 2015/0088703 A1 | 3/2015 | Yan |

(56) References Cited

U.S. PATENT DOCUMENTS

| | | |
|---|---|---|
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0212521 A1 | 7/2015 | Pack et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310601 A1 | 10/2015 | Rodriguez et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0260054 A1 | 9/2016 | High et al. |
| 2016/0271795 A1 | 9/2016 | Vicenti |
| 2016/0313133 A1 | 10/2016 | Zeng et al. |
| 2016/0328618 A1 | 11/2016 | Patel et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0109940 A1 | 4/2017 | Guo et al. |
| 2017/0150129 A1 | 5/2017 | Pangrazio |
| 2017/0178060 A1 | 6/2017 | Schwartz |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0101813 A1 | 4/2018 | Paat et al. |
| 2018/0108134 A1 | 4/2018 | Venable et al. |
| 2018/0114183 A1 | 4/2018 | Howell |
| 2018/0130011 A1 | 5/2018 | Jacobsson |
| 2018/0143003 A1 | 5/2018 | Clayton et al. |
| 2018/0174325 A1 | 6/2018 | Fu et al. |
| 2018/0201423 A1 | 7/2018 | Drzewiecki et al. |
| 2018/0204111 A1 | 7/2018 | Zadeh et al. |
| 2018/0251253 A1 | 9/2018 | Taira et al. |
| 2018/0281191 A1 | 10/2018 | Sinyayskiy et al. |
| 2018/0293442 A1 | 10/2018 | Fridental et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2018/0370727 A1 | 12/2018 | Hance et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0077015 A1 | 3/2019 | Shibasaki et al. |
| 2019/0087663 A1 | 3/2019 | Yamazaki et al. |
| 2019/0094876 A1 | 3/2019 | Moore et al. |
| 2019/0108606 A1 | 4/2019 | Komiyama |
| 2019/0178436 A1* | 6/2019 | Mao ............... G06T 5/002 |
| 2019/0180150 A1 | 6/2019 | Taylor et al. |
| 2019/0197728 A1 | 6/2019 | Yamao |
| 2019/0236530 A1 | 8/2019 | Cantrell et al. |
| 2019/0304132 A1 | 10/2019 | Yoda et al. |
| 2019/0392212 A1 | 12/2019 | Sawhney et al. |
| 2020/0314333 A1* | 10/2020 | Liang ............... G06K 9/00771 |

FOREIGN PATENT DOCUMENTS

| | | |
|---|---|---|
| CN | 104200086 | 12/2014 |
| CN | 107067382 | 8/2017 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| GB | 2323238 | 9/1998 |
| GB | 2330265 | 4/1999 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2018018007 | 1/2018 |
| WO | WO 2018204308 | 11/2018 |

(56) References Cited

FOREIGN PATENT DOCUMENTS

| WO | WO 2018204342 | 11/2018 |
|---|---|---|
| WO | WO 2019023249 | 1/2019 |

OTHER PUBLICATIONS

"Plane Detection in Point Cloud Data" dated Jan. 25, 2010 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Biswas et al. "Depth Camera Based Indoor Mobile Robot Localization and Navigation" Robotics and Automation (ICRA), 2012 IEEE International Conference on IEEE, 2012.
Bohm, Multi-Image Fusion for Occlusion-Free Façade Texturing, International Archives of the Photogrammetry, Remote Sensing and Spatial Information Sciences, pp. 867-872 (Jan. 2004).
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Chen et al. "Improving Octree-Based Occupancy Maps Using Environment Sparsity with Application to Aerial Robot Navigation" Robotics and Automation (ICRA), 2017 IEEE.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing" ACM SIGGRAPH Computer Graphics, vol. 18, No. 3, ACM pp. 137-145, 1984.
Datta, A., et al. "Accurate camera calibration using iterative refinement of control points," in Computer Vision Workshops (ICCV Workshops), 2009.
Deschaud, et al., "A Fast and Accurate Place Detection algoritm for large noisy point clouds using filtered normals and voxel growing," 3DPVT, May 2010, Paris, France. [hal-01097361].
Douillard, Bertrand, et al. "On the segmentation of 3D LIDAR point clouds." Robotics and Automation (ICRA), 2011 IEEE International Conference on IEEE, 2011.
Dubois, M., et al., "A comparison of geometric and energy-based point cloud semantic segmentation methods," European Conference on Mobile Robots (ECMR), p. 88-93, Sep. 25-27, 2013.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Notice of allowance for U.S. Appl. No. 15/211,103 dated Apr. 5, 2017.
Olson, Clark F., etal. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176-.
Park et al., "Autonomous mobile robot navigation using passive rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks," in IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php.
Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12 (1981).
Senthilkumaran, et al., "Edge Detection Techniques for Image Segmentation—A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint," International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=p.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference On, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
United Kingdom Intellectual Property Office, Combined Search and Examination Report dated May 13, 2020 for GB Patent Application No. 1917864.9.

(56) References Cited

OTHER PUBLICATIONS

Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
Fan Zhang et al., "Parallax-tolerant Image Stitching", 2014 Computer Vision Foundation, pp. 4321-4328.
Kaimo Lin et al., "SEAGULL: Seam-guided Local Alignment for Parallax-tolerant Image Stitching", Retrieved on Nov. 16, 2020 [http://publish.illinois.edu/visual-modeling-and-analytics/files/2016/08/Seagull.pdf].
Julio Zaragoza et al., "As-Projective-As-Possible Image Stitching with Moving DLT", 2013 Computer Vision Foundation, pp. 2339-2346.
Flores, et al., "Removing Pedestrians from Google Street View Images", Computer Vision and Pattern Recognition Workshops, 2010 IEEE Computer Society Conference On, IEE, Piscataway, NJ, pp. 53-58 (Jun. 13, 2010).
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds," IEEE, 2016 Conference on Computer vision and Pattern recognition (CVPR), Jun. 27-30, 2016, pp. 1-9.
Hao et al., "Structure-based object detection from scene point clouds," Science Direct, v191, pp. 148-160 (2016).
Hu et al., "An improved method of discrete point cloud filtering based on complex environment," International Journal of Applied Mathematics and Statistics, v48, i18 (2013).
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/US2019/025859 dated Jul. 3, 2019.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
International Search Report and Written Opinion from International Patent Application No. PCT/US2019/064020 dated Feb. 19, 2020.
International Search Report and Written Opinion for International Patent Application No. PCT/US2013/053212 dated Dec. 1, 2014.
International Search Report and Written Opinion for International Patent Application No. PCT/US2013/070996 dated Apr. 2, 2014.
International Search Report and Written Opinion for International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/US2020/028183 dated Jul. 24, 2020.
International Search Report and Written Opinion from International Patent Application No. PCT/US2020/035285 dated Aug. 27, 2020.
Jadhav et al. "Survey on Spatial Domain dynamic template matching technique for scanning linear barcode," International Journal of science and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945 (Year:2009).
Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 I9, pp. 1-20 (2016).
Norriof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.

\* cited by examiner

METHOD, SYSTEM AND APPARATUS FOR SHELF EDGE DETECTION

BACKGROUND

Environments in which objects are managed, such as retail facilities, warehousing and distribution facilities, and the like, may be complex and fluid. For example, a retail facility may include objects such as products for purchase, and a distribution facility may include objects such as parcels or pallets. For example, a given environment may contain a wide variety of objects with different sizes, shapes, and other attributes. Such objects may be supported on shelves in a variety of positions and orientations. The variable position and orientation of the objects, as well as variations in lighting and the placement of labels and other indicia on the objects and the shelves, can render detection of structural features, such as the edges of the shelves, difficult.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
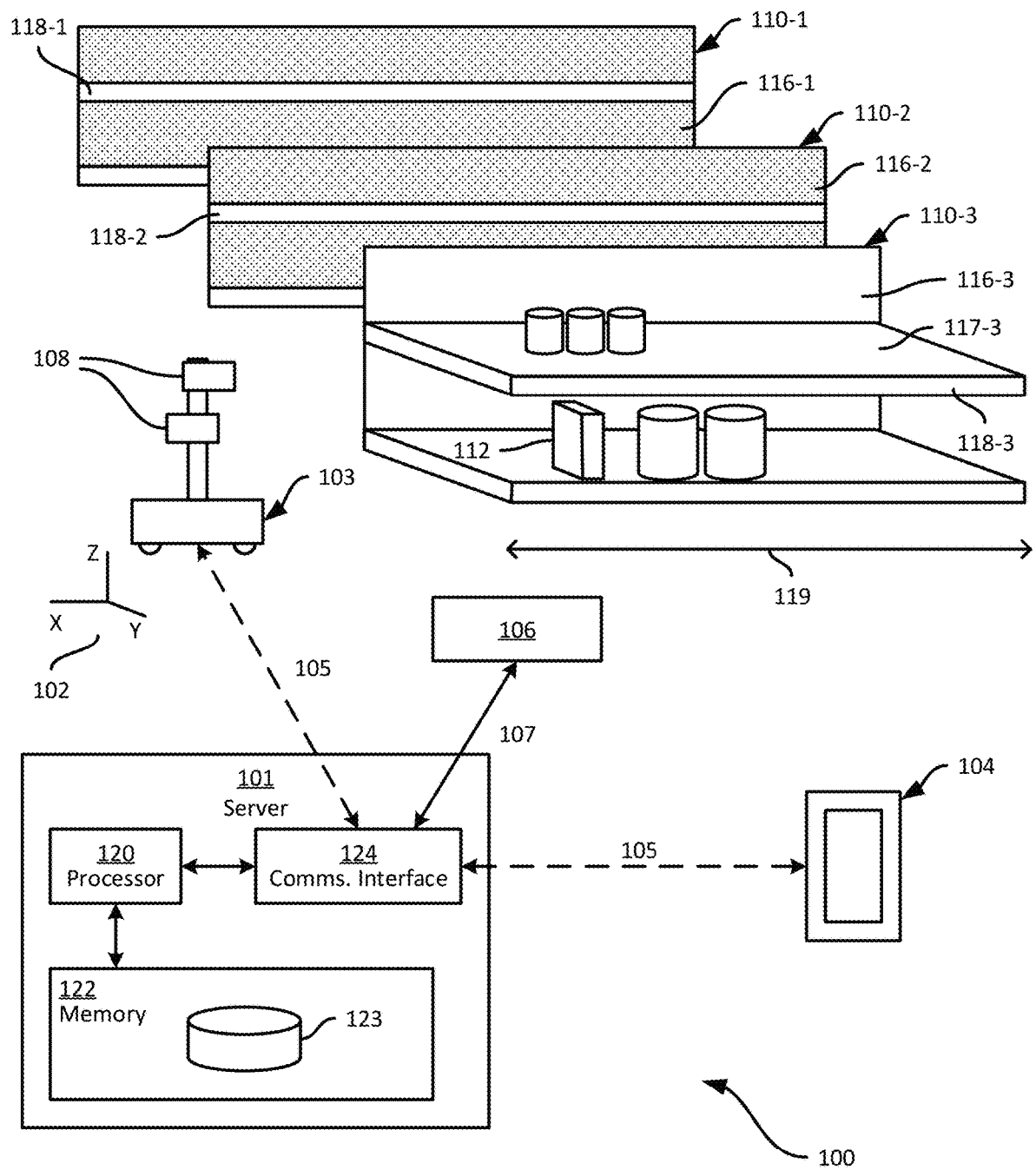
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in an imaging controller, including: obtaining image data captured by an image sensor and a plurality of depth measurements captured by a depth sensor, the image data and the plurality of depth measurements corresponding to an area containing the support surface; detecting preliminary edges in the image data; applying a Hough transform to the preliminary edges to determine Hough lines representing candidate edges of the support surface; segmenting the plurality of depth measurements to assign classes to each pixel, each class defined by one of a plurality of seed pixels, wherein the plurality of seed pixels are identified from the depth measurements based on the Hough lines; and selecting a class of pixels and applying a line-fitting model to the selected class to obtain an estimated edge of the support surface.

Additional examples disclosed herein are directed to a mobile automation apparatus, comprising: a locomotive assembly; an image sensor and a depth sensor; and an imaging controller configured to: obtain image data captured by the image sensor and a plurality of depth measurements captured by the depth sensor, the image data and the plurality of depth measurements corresponding to an area containing the support surface; detect preliminary edges in the image data; apply a Hough transform to the preliminary edges to determine Hough lines representing candidate edges of the support surface; segment the plurality of depth measurements to assign classes to each pixel, each class defined by one of a plurality of seed pixels, wherein the plurality of seed pixels are identified from the depth measurements based on the Hough lines; and select a class of pixels and applying a line-fitting model to the selected class to obtain an estimated edge of the support surface.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 104 via communication links 105, illustrated in the present example as including wireless links. In the present example, the links 105 are provided by a wireless local area network (WLAN) deployed via one or more access points (not shown). In other examples, the server 101, the client device 104, or both, are located remotely (i.e. outside the environment in which the apparatus 103 is deployed), and the links 105 therefore include wide-area networks such as the Internet, mobile networks, and the like. The system 100 also includes a dock 106 for the apparatus 103 in the present example. The dock 106 is in communication with the server 101 via a link 107 that in the present example is a wired link. In other examples, however, the link 107 is a wireless link.

The client computing device 104 is illustrated in FIG. 1 as a mobile computing device, such as a tablet, smart phone or the like. In other examples, the client device 104 is implemented as another type of computing device, such as a desktop computer, a laptop computer, another server, a kiosk, a monitor, and the like. The system 100 can include a plurality of client devices 104 in communication with the server 101 via respective links 105.

The system 100 is deployed, in the illustrated example, in a retail facility including a plurality of support structures such as shelf modules 110-1, 110-2, 110-3 and so on (collectively referred to as shelf modules 110 or shelves 110, and generically referred to as a shelf module 110 or shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 are typically arranged in a plurality of aisles, each of which includes a plurality of modules 110 aligned end-to-end. In such arrangements, the shelf edges 118 face into the aisles, through which customers in the retail facility as well as the apparatus 103 may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to each of the support surface 117-3 and the underside (not shown) of the support surface 117-3. In other examples, the angles between the shelf edge 118-3 and the adjacent surfaces, such as the support surface 117-3, is more or less than ninety degrees.

The apparatus 103 is equipped with a plurality of navigation and data capture sensors 108, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 is deployed within the retail facility and, via communication with the server 101 and use of the sensors 108, navigates autonomously or partially autonomously along a length 119 of at least a portion of the shelves 110. Navigation may be performed according to a frame of reference 102 established within the retail facility. That is, the apparatus 103 tracks its location in the frame of reference 102. While navigating among the shelves 110, the apparatus 103 can capture images, depth measurements and the like, representing the shelves 110 (generally referred to as shelf data or captured data).

The server 101 includes a special purpose controller, such as a processor 120, specifically designed to control and/or assist the mobile automation apparatus 103 to navigate the environment and to capture data. The processor 120 is interconnected with a non-transitory computer readable storage medium, such as a memory 122, having stored thereon computer readable instructions for performing various functionality, including control of the apparatus 103 to navigate the modules 110 and capture shelf data, as well as post-processing of the shelf data. The memory 122 can also store data for use in the above-mentioned control of the apparatus 103, such as a repository 123 containing a map of the retail environment and any other suitable data (e.g. operational constraints for use in controlling the apparatus 103, data captured by the apparatus 103, and the like).

The memory 122 includes a combination of volatile memory (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes a communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 104 and the dock 106—via the links 105 and 107. The links 105 and 107 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail facility via the deployment of one or more wireless access points. The links 105 therefore include either or both wireless links between the apparatus 103 and the mobile device 104 and the above-mentioned access points, and a wired link (e.g. an Ethernet-based link) between the server 101 and the access point.

The processor 120 can therefore obtain data captured by the apparatus 103 via the communications interface 124 for storage (e.g. in the repository 123) and subsequent processing (e.g. to detect objects such as shelved products in the captured data, and detect status information corresponding to the objects). The server 101 may also transmit status notifications (e.g. notifications indicating that products are out-of-stock, in low stock or misplaced) to the client device 104 responsive to the determination of product status data. The client device 104 includes one or more controllers (e.g. central processing units (CPUs) and/or field-programmable gate arrays (FPGAs) and the like) configured to process (e.g. to display) notifications received from the server 101.

Figure 2:
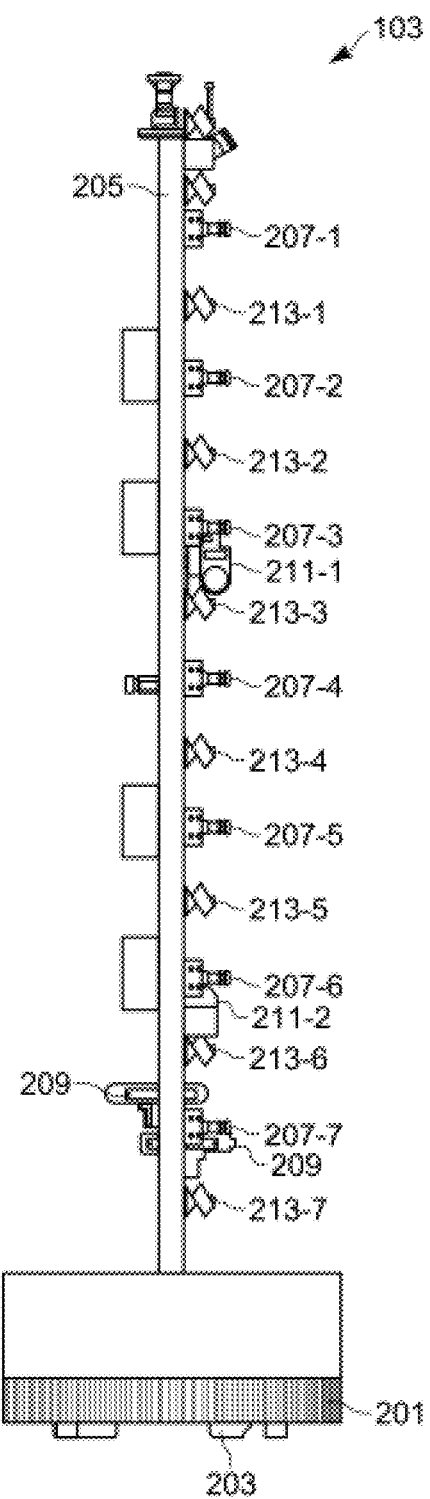
FIG. 2 depicts a mobile automation apparatus in the system of FIG. 1.

Turning now to FIG. 2, the mobile automation apparatus 103 is shown in greater detail. The apparatus 103 includes a chassis 201 containing a locomotive mechanism 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 108 mentioned earlier. In particular, the sensors 108 include at least one imaging sensor 207, such as a digital camera, as well as at least one depth sensor 209, such as a 3D digital camera capable of capturing both depth data and image data. The apparatus 103 also includes additional depth sensors, such as LIDAR sensors 211. As shown in FIG. 2A, the cameras 207 and the LIDAR sensors 211 are arranged on one side of the mast 205, while the depth sensor 209 is arranged on a front of the mast 205. That is, the depth sensor 209 is forward-facing (i.e. captures data in the direction of travel of the apparatus 103), while the cameras 207 and LIDAR sensors 211 are side-facing (i.e. capture data alongside the apparatus 103, in a direction perpendicular to the direction of travel). In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf 110 along the length 119 of which the apparatus 103 is traveling. The apparatus 103 is configured to track a location of the apparatus 103 (e.g. a location of the center of the chassis 201) in a common frame of reference previously established in the retail facility, permitting data captured by the mobile automation apparatus to be registered to the common frame of reference.

Figure 3:
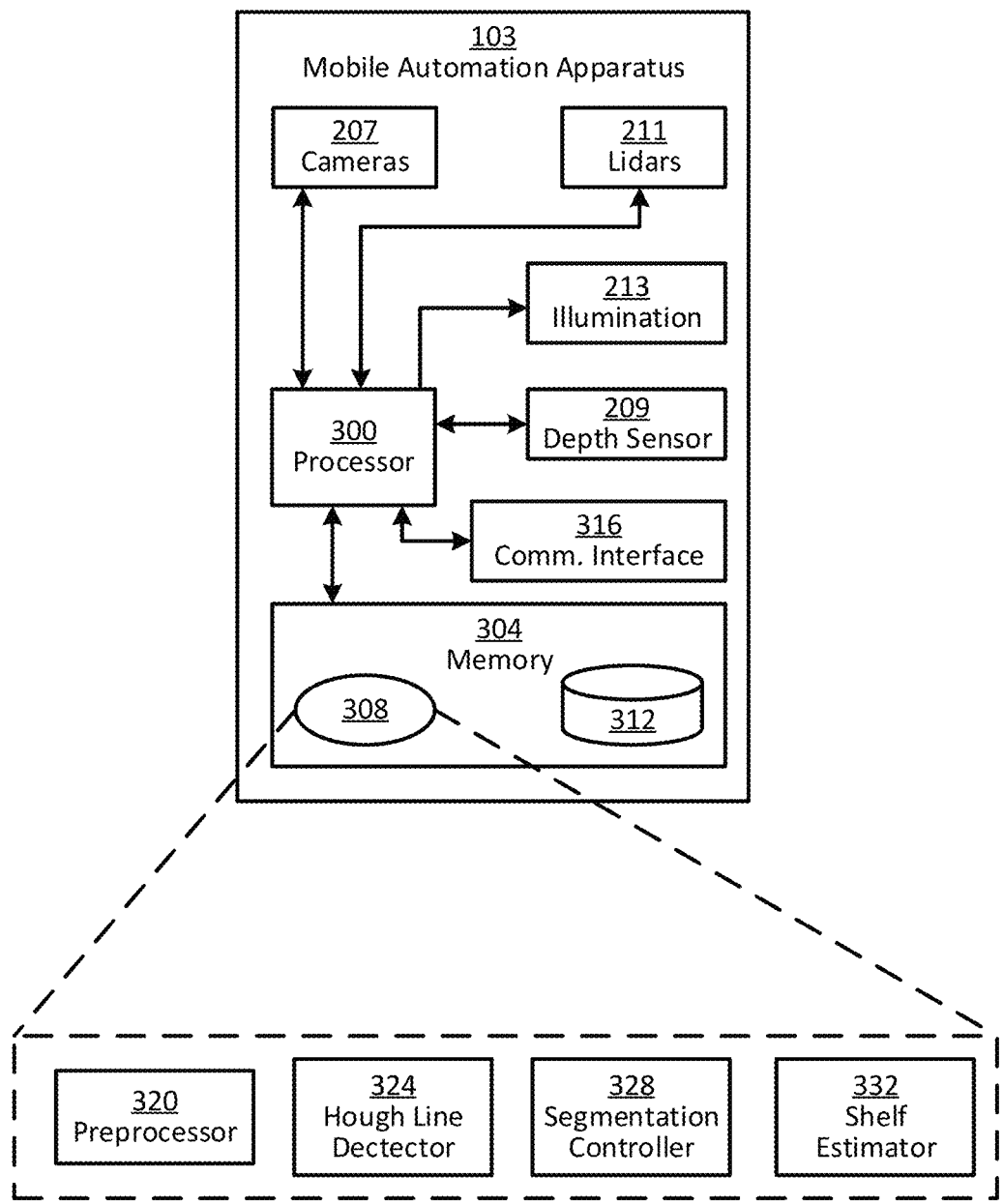
FIG. 3 is a block diagram of certain internal components of the mobile automation apparatus in the system of FIG. 1.

Referring to FIG. 3, certain components of the mobile automation apparatus 103 are shown, in addition to the cameras 207, depth sensor 209, lidars 211, and illumination assemblies 213 mentioned above. The apparatus 103 includes a special-purpose controller, such as a processor 300, interconnected with a non-transitory computer readable storage medium, such as a memory 304. The memory 304 includes a suitable combination of volatile memory (e.g. Random Access Memory or RAM) and non-volatile memory (e.g. read only memory or ROM, Electrically Erasable Programmable Read Only Memory or EEPROM, flash memory). The processor 300 and the memory 304 each comprise one or more integrated circuits. The memory 304 stores computer readable instructions for execution by the processor 300. In particular, the memory 304 stores a control application 308 which, when executed by the processor 300, configures the processor 300 to perform various functions discussed below in greater detail and related to the detection of shelf edges in data captured by the sensors (e.g. the depth sensors 209 or the LIDAR sensors 211). The control application 308 may further configure the processor 300 to perform various functions related to the navigation of the apparatus 103 (e.g. by controlling the locomotive mechanism 203).

The processor 300, when so configured by the execution of the application 308, may also be referred to as a controller 300. Those skilled in the art will appreciate that the functionality implemented by the processor 300 via the execution of the application 308 may also be implemented by one or more specially designed hardware and firmware components, such as FPGAs, ASICs and the like in other embodiments.

The memory 304 may also store a repository 312 containing, for example, a map of the environment in which the apparatus 103 operates, for use during the execution of the application 308. The apparatus 103 also includes a communications interface 316 enabling the apparatus 103 to communicate with the server 101 (e.g. via the link 105 or via the dock 106 and the link 107), for example to receive instructions to navigate to specified locations and initiate data capture operations.

FIG. 3 also illustrates example components of the application 308. As will be apparent to those skilled in the art, the illustrated components may be implemented as a suite of distinct applications in other embodiments. In the present example, the application 308 includes a preprocessor 320 configured to obtain image data and depth measurements and detect preliminary edges in the image data. The application 308 further includes a Hough line detector 324 configured to apply a Hough transform to the preliminary edges to detect Hough lines in the image data. The application 308 further includes a segmentation controller 328 configured to overlay the Hough lines with the depth measurements to obtain seed pixels and segment the depth measurements based on the seed pixels. The application 308 further includes a shelf estimator 332 configured to estimate the shelf edge and the shelf plane based on a class of pixels identified by the segmentation controller 328. In particular, by seeding the depth measurement segmentation with Hough lines in the image data, the resultant object classes are likely to represent shelf edges. Further, the depth measurement segmentation is more tolerant of calibration errors between the image sensor and the depth sensor.

Figure 4:
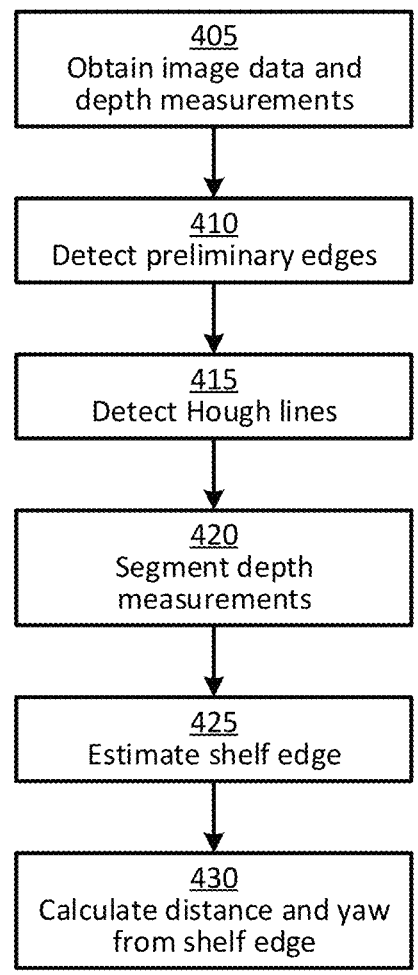
FIG. 4 is a flowchart of a method of detecting an edge of a support surface in the system of FIG. 1.

The functionality of the application 308 to detect shelf edges will now be described in greater detail, with reference to FIG. 4. FIG. 4 illustrates a method 400 of detecting a shelf edge, which will be described in conjunction with its performance in the system 100, and in particular by the apparatus 103, with reference to the components illustrated in FIGS. 2 and 3. As will be apparent in the discussion below, in other examples, some or all of the processing performed by the server 101 may be performed by the apparatus 103, and some or all of the processing performed by the apparatus 103 may be performed by the server 101.

At block 405, the processor 300, and in particular the preprocessor 320, is configured to obtain image data and depth measurements captured, respectively, by an image sensor and a depth sensor and corresponding to an area containing the support surface. In other words, in the present example, the image data and the depth measurements correspond to an area containing at least one shelf support surface 117 and shelf edge 118. The image data and depth measurements obtained at block 405 are, for example, captured by the apparatus 103 and stored in the repository 132. The preprocessor 320 is therefore configured, in the above example, to obtain the image data and depth measurements by retrieving the image data and depth measurements from the repository 132.

In some examples, the preprocessor 320 can also be configured to perform one or more filtering operations on the depth measurements. For example, depth measurements greater than a predefined threshold may be discarded from the data captured at block 405. Such measurements may be indicative of surfaces beyond the shelf backs 116 (e.g. a ceiling, or a wall behind a shelf back 116). The predefined threshold may be selected, for example, as the sum of the known depth of a shelf 110 and the known width of an aisle.

Figure 5A:
FIG. 5A is a diagram of image data obtained during the performance of the method of FIG. 4.
Figure 5B:
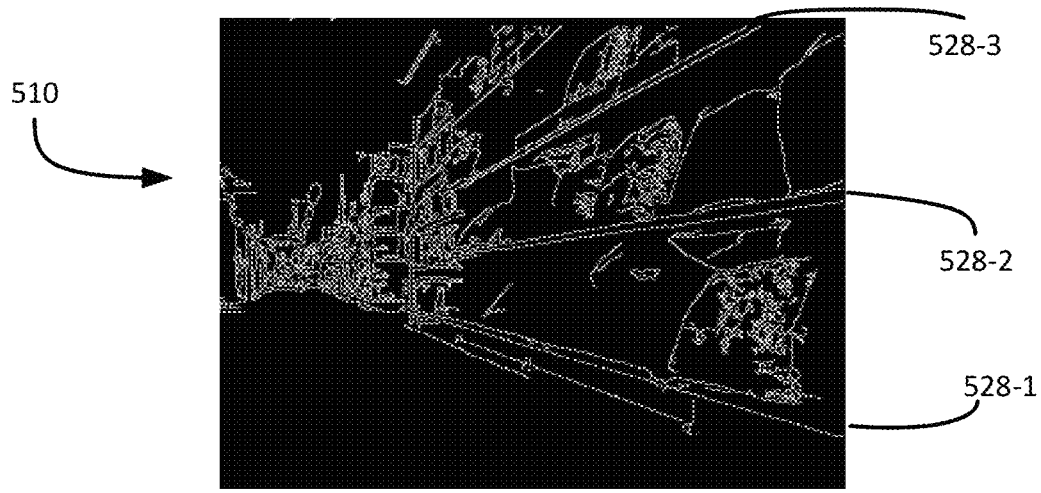
FIG. 5B is a diagram of preliminary edge detection during the performance of the method of FIG. 4.

At block 410, the processor 300, and in particular the preprocessor 320 detects preliminary edges in the image data. For example, referring to FIG. 5A, an image 500 of an example aisle is depicted. The aisle includes a shelf module 510 having support surfaces having shelf edges 518-1, 518-2, and 518-3. The support surfaces create shadows, thus providing high contrast at the shelf edges 518, and allowing edges to be readily detected from the image data. For example, the preprocessor 320 may employ Canny edge detection on the image data to detect the preliminary edges. In particular, the preprocessor 320 may generate a Canny image 520, as depicted in FIG. 5B, including the preliminary Canny edges 528-1, 528-2, and 528-3 representing the shelf edges 518. In other embodiments, the preprocessor 320 may employ other suitable edge detection models.

The Canny edge detection also detects other Canny edges, including edges of products, ends of the shelf modules, and the like. Accordingly, the processor 300 may further process the preliminary edges to determine which edges represent shelf edges. Returning to FIG. 4, at block 415, the processor 300, and in particular the Hough line detector 324, applies a Hough transform on the preliminary edges detected at block 410 to determine Hough lines. In particular, the Hough transform determines, for each pixel position corresponding to a preliminary edge, candidate lines through that pixel position. The candidate lines through the pixel position are mapped as votes for bins in a Hough space, where each bin in the Hough space corresponds to a set of parameters defining a candidate line within the image source. For example, the parameters generally include a distance p defining the distance from the origin (in the image frame of reference) to the point on the candidate line closest to the origin. The parameters generally also include an angle θ defining the angle between the horizontal axis (i.e., the x axis) and the line connecting the candidate line to the origin. The bin having the highest number of votes defines a Hough line based on the parameters of the bin. In the present example, bins having at least a threshold number of votes may define Hough lines.

Figure 5C:
FIG. 5C is a diagram of Hough lines overlaid on image data during the performance of the method of FIG. 4.

Turning to FIG. 5C, the image 500 is overlaid with Hough lines 538 determined at block 415. In particular, the Hough lines 538 substantially overlay the shelf edges 518, as well as some product edges and the vertical edges of the shelf module 510. The processor 300 may expect that substantially vertical Hough lines detected in the image space are unlikely to represent the shelf edges 518. Accordingly, the Hough line detector 324 may further to be configured, at block 415, to perform one or more filtering operations to discard Hough lines within a threshold angle of vertical. Specifically, the Hough line detector 324 may be configured to determine an angle between a given Hough line and a vertical line. Hough lines having an angle below the threshold angle from vertical may be discarded. Thus, for example, the Hough line 538-1 may be filtered out. The remaining Hough lines 538 may be assumed to be candidate edges of the shelf.

Returning again to FIG. 4, at block 420, the processor 300, and in particular the segmentation controller 328, segments the depth measurements. Specifically, the segmentation controller 328 is configured to assign an object class to each depth measurement, wherein each object class corresponds to a distinct object in the image data. For example, the segmentation controller 328 may segment the image data into a ground class representing the ground or floor of the aisle, and one or more object classes representing distinct objects in the aisle. In particular, some of the object classes may correspond to edges of the support surfaces in the aisle or products on the support surfaces.

Figure 6:
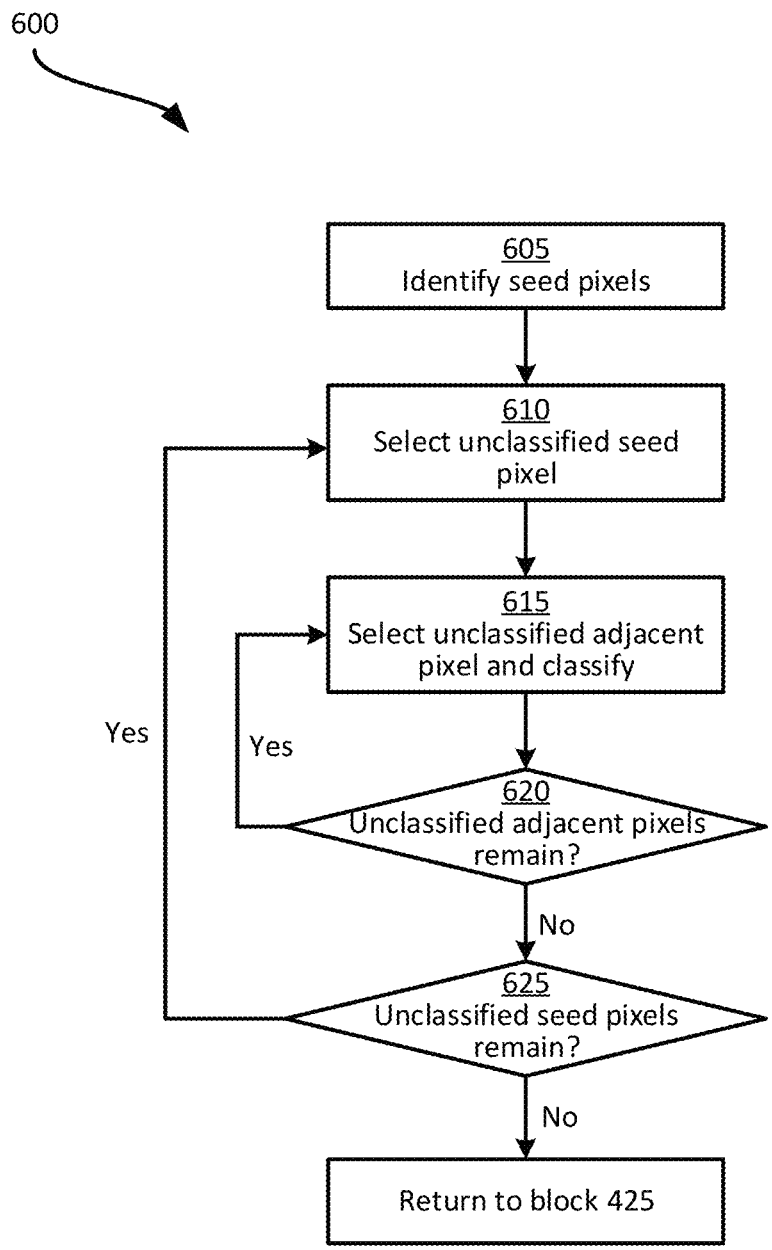
FIG. 6 is a flowchart illustrating an example method of performance of block 420 of the method of FIG. 4.

FIG. 6 depicts a method 600 of segmenting depth measurements as performed by the segmentation controller 328. Generally, the segmentation controller 328 employs a segmentation algorithm to grow object classes based on a seed pixel depth measurement for each object class. More particularly, the seed pixel depth measurements are derived based on the Hough lines, and thus, the resulting object classes represent objects having linear components, such as shelf edges.

At block 605, the segmentation controller 328 is configured to identify a plurality of seed pixels from the depth measurements. Specifically, the segmentation controller 328 overlays the Hough lines with the depth measurements, for example, using a predefined correspondence between the image sensor and the depth sensor. The depth measurements corresponding to Hough lines are identified as seed pixels.

In some embodiments, the segmentation controller 328 may further be configured to filter out the ground class of depth measurements prior to identifying seed pixels. Specifically, the segmentation controller 328 may select a ground seed pixel at or near the bottom of the image space (e.g. based on predefined criteria). The segmentation controller 328 may then grow a ground class based on the selected ground seed pixel using the segmentation algorithm as will be described further below. Thus, the seed pixels identified at block 605 may include depth measurements corresponding to Hough lines and not classified as ground pixels.

Figure 7A:
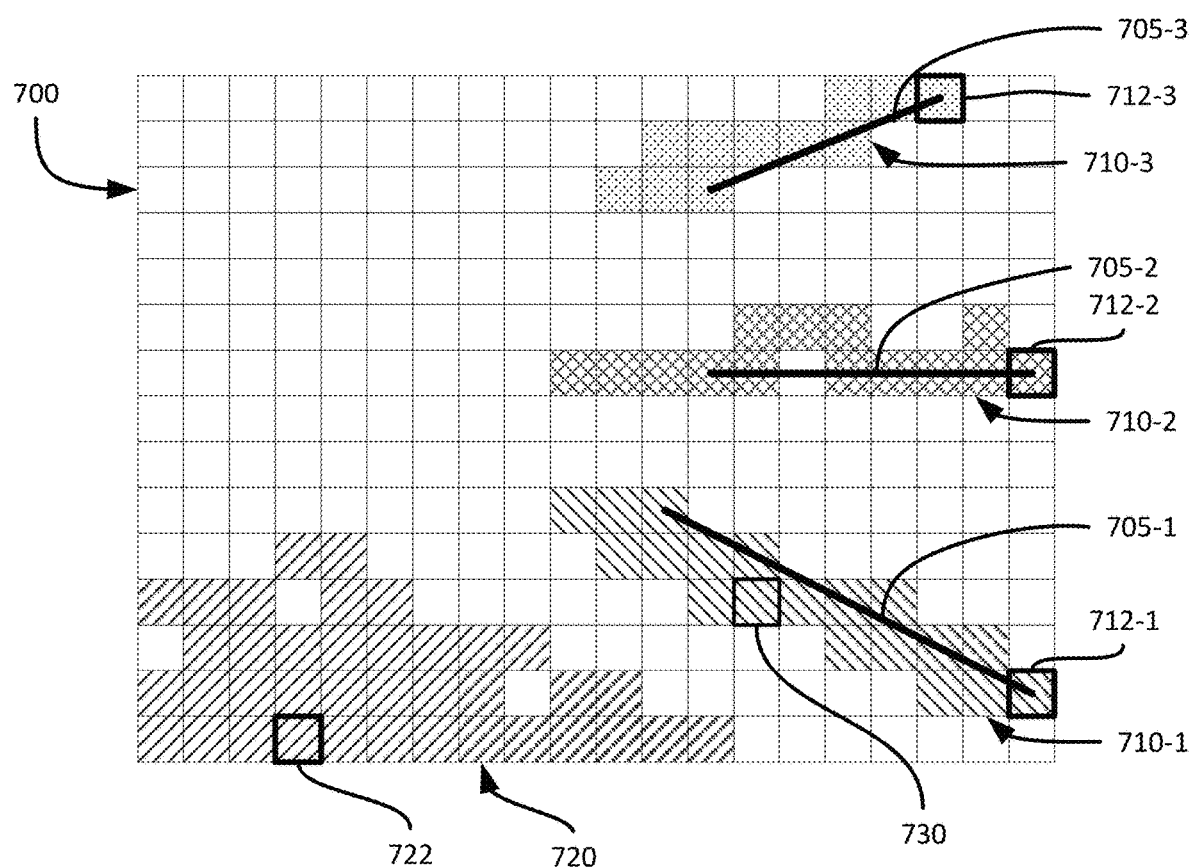
FIG. 7A is a diagram illustrating segmented depth measurements after the performance of block 420 of the method of FIG. 4.

For example, referring to FIG. 7A, an image 700 representing the segmented depth measurements is depicted. The image 700 includes Hough lines 705-1, 705-2, and 705-3 overlaid with the depth measurements. The Hough lines 705 define seed pixels 712-1, 712-2 and 712-3, which define object classes 710-1, 710-2, and 710-3. The Hough lines 705 also define seed pixels at other depth measurements along the Hough lines 705, however, as depicted, these seed pixels are included in the object classes defined by the seed pixels 712. The image 700 further includes a ground class 720 originating from a ground seed pixel 722. The depth measurements in the ground class 720 may therefore be discarded prior to identifying or selecting seed pixels.

Returning to FIG. 6, at block 610, the processor 300 is configured to select an unclassified object seed pixel. The seed pixel may be, for example, a seed pixel determined at block 605, which is not classified as being in the ground class. The segmentation controller 328 is further configured to define an object class based on the selected seed pixel. In particular, the object class will be grown iteratively using the segmentation algorithm.

Having selected a seed pixel from which to grow an object class, the method 600 proceeds to block 615 to grow the object class. At block 615, the segmentation controller 328 selects an unclassified pixel adjacent to a pixel in the object class. For example, in the first iteration, the segmentation controller 328 selects an unclassified pixel adjacent to the seed pixel selected at block 610. The segmentation controller 328 then determines whether the selected adjacent pixel is part of the object class.

For example, the segmentation controller 328 may employ an angle segmentation algorithm, as outlined in "Efficient Online Segmentation for Sparse 3D Laser Scans" (Igor Bogoslayskyi & Cyrill Stachniss, Bonn). Specifically, given a first point and a second point in 3D space, the segmentation controller 328 determines an angle β between an origin in the image frame of reference, the second point, and the first point. That is, the segmentation controller 328 determines an angle β between a first line from the first point to the second point and a second line from the origin in the image frame of reference to the second point. When the angle β is above a threshold angle, the first point and the second point are determined to be the same object.

Figure 7B:
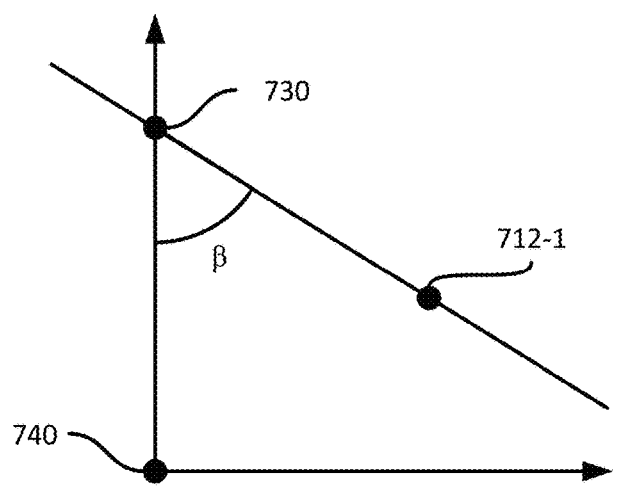
FIG. 7B is a diagram illustrating angle segmentation.

For example, referring to FIGS. 7A and 7B, the segmentation controller 328 may employ the angle segmentation algorithm to determine whether the pixel 730 is in the object class 710 defined by the seed pixel 712-1. The segmentation controller 328 determines an angle β between the origin 740, the pixel 730, and the seed pixel 712-1 based on the depth measurements of the pixel 730 and the seed pixel 712-1 relative to the origin 740. FIG. 7B depicts an overhead view of the angle β between the origin 740, the pixel 730, and the seed pixel 712-1. When the angle β is above a threshold angle, the pixel 730 is determined to be the same object as the seed pixel 712-1, and is classified as part of the object class 710-1 and is added to the object class.

Thus, at block 615, the segmentation controller 328 classifies the selected adjacent pixel. Specifically, when the segmentation controller 328 determines that the selected adjacent pixel is part of the object class, the selected adjacent pixel is added to the object class. If the adjacent pixel is not part of the object class, the segmentation controller 328 may classify it to indicate that the pixel has been assessed for the current object class. The method 600 then proceeds to block 620.

At block 620, the segmentation controller 328 determines if there are any unclassified pixels adjacent to pixels in the current object class. If there are, the segmentation controller 328 returns to block 615 to select an unclassified adjacent pixel. Thus, the segmentation controller 328 iterates through adjacent pixels to grow the object class. If, at block 620, there are no adjacent unclassified pixels, then the current object class is complete, and the segmentation controller 328 proceeds to block 625.

At block 625, the segmentation controller 328 determines if there are any unclassified seed pixels. If there are, the segmentation controller 328 returns to block 610 to select an unclassified seed pixel and define a new object class. Thus, the segmentation controller 328 iterates through the seed pixels to segment the depth measurements into distinct object classes. In particular, as the seed pixels are based on Hough lines, the resulting object classes represent objects having a linear component, and are likely to be shelf edges. Additional constraints may also be applied to select shelf edges, as will be described further below.

Returning to FIG. 4, at block 425, the processor 300, and in particular the shelf estimator 332, is configured to compute an estimated edge of the support surface. Specifically, the shelf estimator 332 selects a class of pixels as segmented at block 420 as a predicted shelf edge. For example, the shelf estimator 332 may select the largest class of pixels satisfying predefined constraints within which a shelf edge is expected to comply. For example, the shelf estimator 332 may expect that a difference in height between pixels in the class and its seed pixel are within a first threshold distance (e.g. 5 cm). That is, a shelf edge is expected to have a maximum height, and hence classes having heights exceeding the first threshold distance may be discarded as potential shelf edges. Further, the shelf estimator 332 may expect that a distance between consecutive pixels in the class are within a second threshold distance. That is, a shelf edge is expected to have good point density.

The shelf estimator 332 may then apply a line-fitting model (e.g. RANSAC) to the selected class to obtain an estimated shelf edge. In some embodiments, the shelf estimator 332 may further obtain an estimated support surface plane (shelf plane) based on the estimated shelf edge by assuming that the shelf edge is substantially vertical, and may be represented by a vertical plane. Accordingly, the estimated shelf plane is the plane defined by the estimated shelf edge and a vertical line.

At block 425, the processor 300 may further be configured to compute a current distance and a current yaw of the apparatus 103 to the shelf plane. The current distance and current yaw of the apparatus 103 to the shelf plane may be used in the navigation of the apparatus 103, and in particular, to maintain a constant distance and yaw of the apparatus 103 while navigating the aisle. In particular, the processor 300 may add the current distance to a distance buffer including a plurality of previously computed distances, and the current yaw to a yaw buffer including a plurality of previously computed yaws. The processor 300 may then compute an average distance and an average yaw based, respectively, on the distance buffer and the yaw buffer. Thus, the impact of a bad shelf plane detection may be minimized by the buffer.

Figure 8:
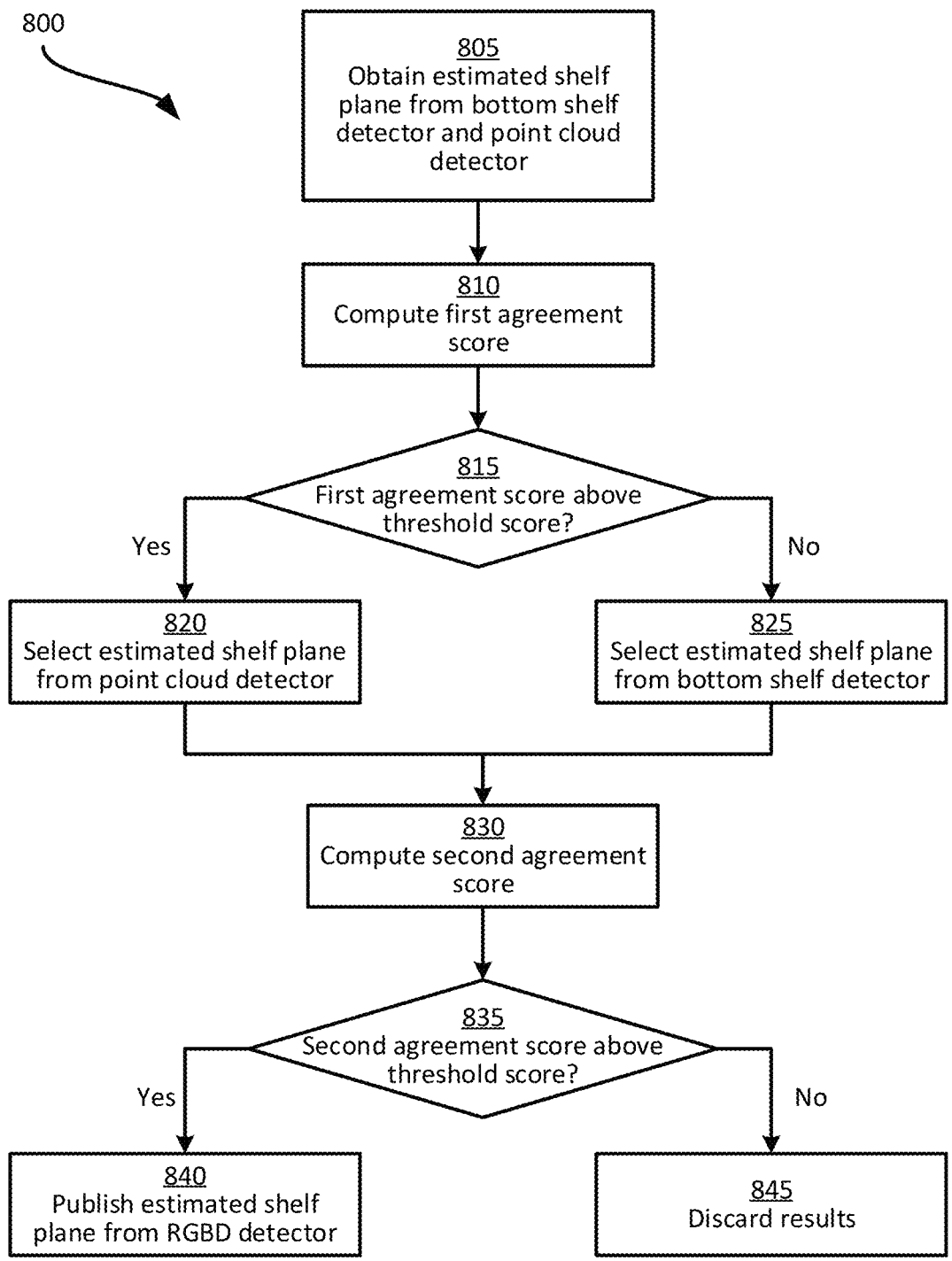
FIG. 8 is a flowchart of a method of fusing results from multiple shelf plane detectors.

In some embodiments, the processor 300 may further be configured to fuse the output of the present shelf plane detection with one or more additional shelf plane detection methods. For example, the apparatus 103 may further employ a bottom shelf detector, and a point cloud shelf detector in addition to the present RGBD shelf detector. FIG. 8 depicts a method 800 of fusing the outputs of the three detection methods.

At block 805, the processor 300 obtains estimated support surface (shelf) plane results from the bottom shelf detector and the point cloud shelf detector.

At block 810, the processor 300 is configured to compute an agreement score between the estimated shelf planes from the bottom shelf detector and the point cloud detector. Specifically, the processor 300 may determine whether distance and yaw measurements from the estimated shelf planes agree. To determine whether the measurements for two detection methods agree, the processor 300 computes the agreement score given by equation (1), where v and u represent the respective direction vectors reconstructed using the distance and yaw measurements from the two detection methods.

$$\text{score} \stackrel{\circ}{=} v \cdot u - \left| \begin{matrix} v_{q,xx} & v_{q,xy} \\ v_{q,yz} & v_{q,yy} \end{matrix} \right| - \left| \begin{matrix} u_{q,xx} & u_{q,xy} \\ u_{q,yz} & u_{q,yy} \end{matrix} \right| \quad (1)$$

Thus, the agreement score is based on the dot product of the two vectors minus the Frobenius norm of the covariance matrix associated with each detection method.

At block 815, the processor 300 determines which estimated shelf plane to push forwards based on the computed agreement score. Specifically, if the agreement score is above the threshold score, the processor 300 determines that the estimated shelf plane results from the bottom shelf point cloud detector and the point cloud shelf detector agree, and proceeds to block 820. At block 820, the processor 300 selects the estimated shelf plane from the point cloud detector as a comparison plane for the RGBD detector results. The method 800 then proceeds to block 830.

If the agreement score computed at block 810 is below the threshold score, the processor 300 determines that the estimated shelf plane results from the bottom shelf point cloud detector and the point cloud shelf detector do not agree and proceeds to block 825. At block 825, the processor 300 selects the estimated shelf plane from the bottom shelf detector as the comparison plane for the RGBD detector results. Specifically, the processor 300 expects that the estimated shelf plane from the bottom shelf detector is more accurate. The method then proceeds to block 830.

At block 830, the processor 300 computes a second agreement score between the comparison plane obtained from block 820 or block 825 and the estimated shelf plane from the RGBD detector results. Specifically, the processor 300 computes the second agreement score based on equation (1).

At block 835, the processor 300 determines whether to publish an estimated shelf plane based on the second computed agreement score. If the second agreement score is above the threshold score, the processor 300 determines that the estimated shelf plane from the RGBD detector and the comparison plane agree and proceeds to block 840. At block 840, the processor 300 selects the estimated shelf plane from the RGBD detector, for example, for navigational operations in the apparatus 103.

If the second agreement score computed at block 830 is below the threshold score, the processor 300 is configured to proceed to block 845. At block 845, the processor 300 is configured to discard the results of the frame and wait for the subsequent frame.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . ", "has . . . ", "includes . . . ", "contains . . . " does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of detecting an edge of a support surface by an imaging controller, the method comprising:
    obtaining image data captured by an image sensor and a plurality of depth measurements captured by a depth sensor, the image data and the plurality of depth measurements corresponding to an area containing the support surface;
    detecting preliminary edges in the image data;
    applying a Hough transform to the preliminary edges to determine Hough lines representing candidate edges of the support surface;
    segmenting the plurality of depth measurements to assign classes to each pixel, each class defined by one of a plurality of seed pixels, wherein the plurality of seed pixels are identified from the depth measurements based on the Hough lines; and
    detecting the edge of the support surface by selecting a class of pixels and applying a line-fitting model to the selected class to obtain an estimated edge of the support surface,
    wherein segmenting the plurality of depth measurements comprises:
        overlaying the Hough lines with the depth measurements and identifying the seed pixels as the depth measurements which correspond to Hough lines;
        selecting a seed pixel and defining an object class based on the selected seed pixel;
        iteratively growing the object class by:
            selecting an unclassified pixel adjacent to a pixel in the object class;
            determining if the unclassified adjacent pixel is part of the object class; and
            when the determination is positive, adding the unclassified adjacent pixel to the object class.

2. The method of claim 1, wherein determining if the unclassified adjacent pixel is part of the object class comprises:
    determining an angle between an origin in the image frame of reference, the unclassified adjacent pixel, and the pixel in the object class; and
    when the angle is above a predefined threshold, determining that the unclassified adjacent pixel is part of the object class.

3. The method of claim 1, further comprising, prior to segmenting the depth measurements, discarding Hough lines within a threshold angle of vertical.

4. The method of claim 1, further comprising, prior to segmenting the depth measurements:
    selecting a ground seed pixel and defining a ground class for the ground seed pixel;

iteratively growing the ground class by:
  selecting an unclassified pixel adjacent to a pixel in the ground class;
  determining if the unclassified adjacent pixel is part of the ground class; and
  when the determination is positive, adding the unclassified adjacent pixel to the ground class; and
  discarding pixels in the ground class.

5. The method of claim 1, further comprising estimating a support surface plane associated with the support surface as a vertical plane of the estimated edge of the support surface.

6. The method of claim 5, further comprising, based on the estimated support surface plane:
  computing a current distance of an apparatus of the imaging controller to the estimated support surface plane; and
  computing a current yaw of the apparatus to the estimated support surface plane.

7. The method of claim 6, further comprising:
  computing an average distance of the apparatus to the estimated support surface plane based on the current distance and a plurality of previous distances; and
  computing an average yaw of the apparatus to the estimated support surface plane based on the current yaw and a plurality of previous yaws.

8. The method of claim 6, further comprising:
  obtaining a second estimated support surface plane, the second estimated support surface plane computed by a different detection method;
  computing an agreement score of the estimated support surface plane and the second estimated support surface plane; and
  when the agreement score is above a threshold score, publishing the estimated support surface plane as a detected support surface plane.

9. The method of claim 1, wherein selecting the class of pixels comprises selecting a largest object class wherein a difference in height between pixels in the class and its seed pixel are within a first threshold distance; and wherein a distance between consecutive pixels in the class are within a second threshold distance.

10. A mobile automation apparatus, comprising:
  a locomotive assembly;
  an image sensor and a depth sensor; and
  an imaging controller configured to:
    obtain image data captured by the image sensor and a plurality of depth measurements captured by the depth sensor, the image data and the plurality of depth measurements corresponding to an area containing the support surface;
    detect preliminary edges in the image data;
    apply a Hough transform to the preliminary edges to determine Hough lines representing candidate edges of the support surface;
    segment the plurality of depth measurements to assign classes to each pixel, each class defined by one of a plurality of seed pixels, wherein the plurality of seed pixels are identified from the depth measurements based on the Hough lines; and
    detect an edge of the support surface by selecting a class of pixels and applying a line-fitting model to the selected class to obtain an estimated edge of the support surface,
  wherein the imaging controller is further configured to:
    estimate a support surface plane associated with the support surface as a vertical plane of the estimated edge of the support surface;
    obtain a second estimated support surface plane, the second estimated support surface plan computed by a different detection method;
    compute an agreement score of the estimated support surface plane and the second estimated support surface plane; and
    when the agreement score is above a threshold score, publish the estimated support surface plane as a detected support surface plane.

11. The mobile automation apparatus of claim 10, wherein the imaging controller is configured to segment the depth measurements by:
  overlaying the Hough lines with the depth measurements and identifying the seed pixels as the depth measurements which correspond to Hough lines;
  selecting a seed pixel and defining an object class based on the selected seed pixel;
  iteratively growing the object class by:
    selecting an unclassified pixel adjacent to a pixel in the object class;
    determining if the unclassified adjacent pixel is part of the object class; and
    when the determination is positive, adding the unclassified adjacent pixel to the object class.

12. The mobile automation apparatus of claim 11, wherein the imaging controller is configured to determine if the unclassified adjacent pixel is part of the object class by:
  determining an angle between an origin in the image frame of reference, the unclassified adjacent pixel, and the pixel in the object class; and
  when the angle is above a predefined threshold, determining that the unclassified adjacent pixel is part of the object class.

13. The mobile automation apparatus of claim 10, wherein the imaging controller is further configured to, prior to segmenting the depth measurements, discard Hough lines within a threshold angle of vertical.

14. The mobile automation apparatus of claim 10, wherein the imaging controller is further configured to, prior to segmenting the depth measurements:
  select a ground seed pixel and defining a ground class for the ground seed pixel;
  iteratively grow the ground class by:
    selecting an unclassified pixel adjacent to a pixel in the ground class;
    determining if the unclassified adjacent pixel is part of the ground class; and
    when the determination is positive, adding the unclassified adjacent pixel to the ground class; and
  discard pixels in the ground class.

15. The mobile automation apparatus of claim 10, wherein the imaging controller is further configured to, based on the estimated support surface plane:
  compute a current distance of an apparatus of the imaging controller to the estimated support surface plane; and
  compute a current yaw of the apparatus to the estimated support surface plane.

16. The mobile automation apparatus of claim 15, wherein the imaging controller is further configured to:
  compute an average distance of the apparatus to the estimated support surface plane based on the current distance and a plurality of previous distances; and compute an average yaw of the apparatus to the estimated support surface plane based on the current yaw and a plurality of previous yaws.

17. The mobile automation apparatus of claim 10, wherein the imaging controller is further configured to select the class of pixels by selecting a largest object class wherein a difference in height between pixels in the class and its seed pixel are within a first threshold distance; and wherein a distance between consecutive pixels in the class are within a second threshold distance.

18. A method of detecting an edge of a support surface by an imaging controller, the method comprising:
  obtaining image data captured by an image sensor and a plurality of depth measurements captured by a depth sensor, the image data and the plurality of depth measurements corresponding to an area containing the support surface;
  detecting preliminary edges in the image data;
  applying a Hough transform to the preliminary edges to determine Hough lines representing candidate edges of the support surface;
  segmenting the plurality of depth measurements to assign classes to each pixel, each class defined by one of a plurality of seed pixels, wherein the plurality of seed pixels are identified from the depth measurements based on the Hough lines;
  detecting the edge of the support surface by selecting a class of pixels and applying a line-fitting model to the selected class to obtain an estimated edge of the support surface; and
  prior to segmenting the depth measurements:
    selecting a ground seed pixel and defining a ground class for the ground seed pixel,
    iteratively growing the ground class by:
      selecting an unclassified pixel adjacent to a pixel in the ground class,
      determining if the unclassified adjacent pixel is part of the ground class,
      when the determination is positive, adding the unclassified adjacent pixel to the ground class, and
    discarding pixels in the ground class.

\* \* \* \* \*